(12) United States Patent
de Winter

(10) Patent No.: US 7,046,462 B2
(45) Date of Patent: May 16, 2006

(54) LENS MOUNT FOR VIEWFINDER CAMERAS

(75) Inventor: André de Winter, Leun (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 10/771,137

(22) Filed: Feb. 4, 2004

(65) Prior Publication Data

US 2005/0088764 A1    Apr. 28, 2005

(30) Foreign Application Priority Data

Mar. 20, 2003  (DE) .......................... 203 04 476 U

(51) Int. Cl.
*G02B 7/02*    (2006.01)

(52) U.S. Cl. ....................... 359/829; 359/822; 359/828

(58) Field of Classification Search ................ 359/676, 359/694, 699–706, 811, 813, 822, 828–830, 359/825–826, 815–819
See application file for complete search history.

(56) References Cited

U.S. PATENT DOCUMENTS

| | | | |
|---|---|---|---|
| 3,677,155 A | 7/1972 | Bechmann | 396/529 |
| 5,381,272 A * | 1/1995 | Kato et al. | 359/823 |
| 5,416,549 A * | 5/1995 | Katsuyama et al. | 396/529 |
| 5,774,282 A * | 6/1998 | Kohmoto et al. | 359/823 |
| 6,476,978 B1 | 11/2002 | Takahashi | 359/784 |

FOREIGN PATENT DOCUMENTS

| | | |
|---|---|---|
| DE | 2 040 227 | 2/1972 |
| DE | 101 29 325 A1 | 3/2002 |
| JP | 61-18910 A | 1/1986 |
| JP | 6-258563 A | 9/1994 |
| JP | 6-308362 A | 11/1994 |
| JP | 11-109207 A | 4/1999 |

* cited by examiner

*Primary Examiner*—Jordan M. Schwart
*Assistant Examiner*—Jessica Stultz
(74) *Attorney, Agent, or Firm*—Foley & Lardner LLP

(57) ABSTRACT

A lens mount for viewfinder cameras, having a distance setting ring and, coupled thereto, an apparatus for transmitting the set distance to the setting lever of a measuring viewfinder arranged on the camera side. The apparatus contains an outer worm connected to the distance setting ring, an inner worm, inserted in said outer worm and guided rectilinearly in the lens mount, and a cam ring rotatably supported in the inner worm and with an axial cam pointing to the camera on the end face, is characterized in that the cam ring is locked into an annular groove in the inner wall of the inner worm and is provided with preferably two pins which point radially outward over the edge of the inner worm at the end of the camera side, and which engage in each case in an axial groove in the outer worm.

11 Claims, 2 Drawing Sheets

LENS MOUNT FOR VIEWFINDER CAMERAS

BACKGROUND OF THE INVENTION

A lens mount is known from DE 2 040 227 A1. The lens mount includes several imaging lenses which can be displaced along the optical axis of the system by a distance setting ring in order in each case to image an object to be recorded sharply in the film plane. The distance setting ring is connected for this purpose to an outer threaded tube, designed as a worm, as drive apparatus. Inserted into this threaded tube is an inner threaded tube, which is likewise designed as a worm and is linearly guided in the lens mount such that the rotation of the outer threaded tube is converted into a displacement of the inner threaded tube along the optical axis of the system. The imaging lenses are inserted in a stationary fashion into the inner threaded tube and therefore participate in this longitudinal displacement.

Moreover, a cam ring which is driven by a pilot pin connected to the outer threaded tube is inserted rotatably into the inner threaded tube on the camera side. The cam ring rests for this purpose on a shoulder turned into the inner wall of the inner threaded tube, and is held by a retaining ring screwed onto the inner threaded tube. The pilot pin is connected to the cam ring through a radial slot in the inner threaded tube. The cam ring has an axial cam on its end face on the camera side. Bearing against the axial cam via a roller is a plunger which is mounted to swivel about an axis perpendicular to the optical axis of the system. The plunger is coupled to the setting lever of the measuring viewfinder.

Consequently, as the distance setting ring rotates, the cam ring is, on the one hand, axially displaced and, on the other hand rotated about the optical axis of the system. It is possible in this way, via the gradient of the axial cam to balance different stroke travels, dependent on focal length, and non-linearities between the axial setting movement of the optical imaging system and the movement coupled thereto of the setting lever for the measuring viewfinder.

In the case of cameras with interchangeable lenses, the respective setting of the setting lever for the measuring viewfinder is assigned for all cameras to a specific distance for the sharp definition of an object to be recorded. Because of the manufacturing tolerances in the case of the lenses, the sharp focusing thereof frequently does not correspond to the sharp focusing indicated by the measuring viewfinder via the setting lever. In order to compensate these faults, each lens must be provided with an individually adapted axial cam. Since this individual adaptation can be carried out only with a finally mounted lens, the accessibility of the axial cam for reworking acquires great significance.

SUMMARY OF THE INVENTION

The invention relates to a lens mount for viewfinder cameras, having a distance setting ring and, coupled thereto, an apparatus for transmitting the set distance to the setting lever of a measuring viewfinder arranged on the camera side, the apparatus containing an outer worm, an inner worm, inserted in said outer worm and guided rectilinearly in the lens mount, and a cam ring rotatably supported in the inner worm and with an axial cam pointing to the camera on the end face.

The known lens mount has a very complicated design. The refaining ring for holding the cam ring, in particular, must be set and secured very exactly in order to ensure that the cam ring is rotatably mounted without play. The design requires a far-reaching breakdown of the drive elements for the cam ring in order to be able to disassemble the latter. Moreover, a greater overall length results for the lens mount because of the interposed plunger. Reworking the axial cam with the cam ring installed firstly requires the plunger and its tilting bearing to be dismounted from the lens mount.

It was therefore the object of the invention to simplify the bearing of the cam ring, to facilitate the mounting of the cam ring without influencing its drive elements, and to reduce the overall length of the lens mount.

This object is achieved in the case of a lens mount of the type mentioned at the beginning by virtue of the fact that the cam ring is locked into an annular groove in the inner wall of the inner worm and is provided with preferably two pins which point radially outward over the edge of the inner worm at the end of the camera side, and which engage in each case in an axial groove in the outer worm.

The locking of the cam ring in the annular groove is rendered possible by virtue of the fact that the inner worm is provided at the end on the camera side with preferably two cutouts situated diametrically opposite one another and exposing the annular groove, and the cam ring has on its outer circumference preferably two sliding noses adapted to the cutouts and to the cross section of the annular groove.

In order to maintain the locking in the case of setting the distance, it must be ensured that the radial position of the pins in the cam ring and the axial grooves in the outer worm are selected such that over the entire rotary path of the distance setting ring the sliding noses are guided inside the closed region of the annular groove in the inner worm. The pins can preferably be screwed into the outer wall of the cam ring through the axial groove in the outer worm.

BRIEF DESCRIPTION OF THE DRAWINGS

An exemplary embodiment of the lens mount according to the invention is illustrated diagrammatically in the drawing and is described in more detail with the aid of FIG. 1. In the drawing.

DETAILED DESCRIPTION OF SOME EMBODIMENTS

Figure 1:
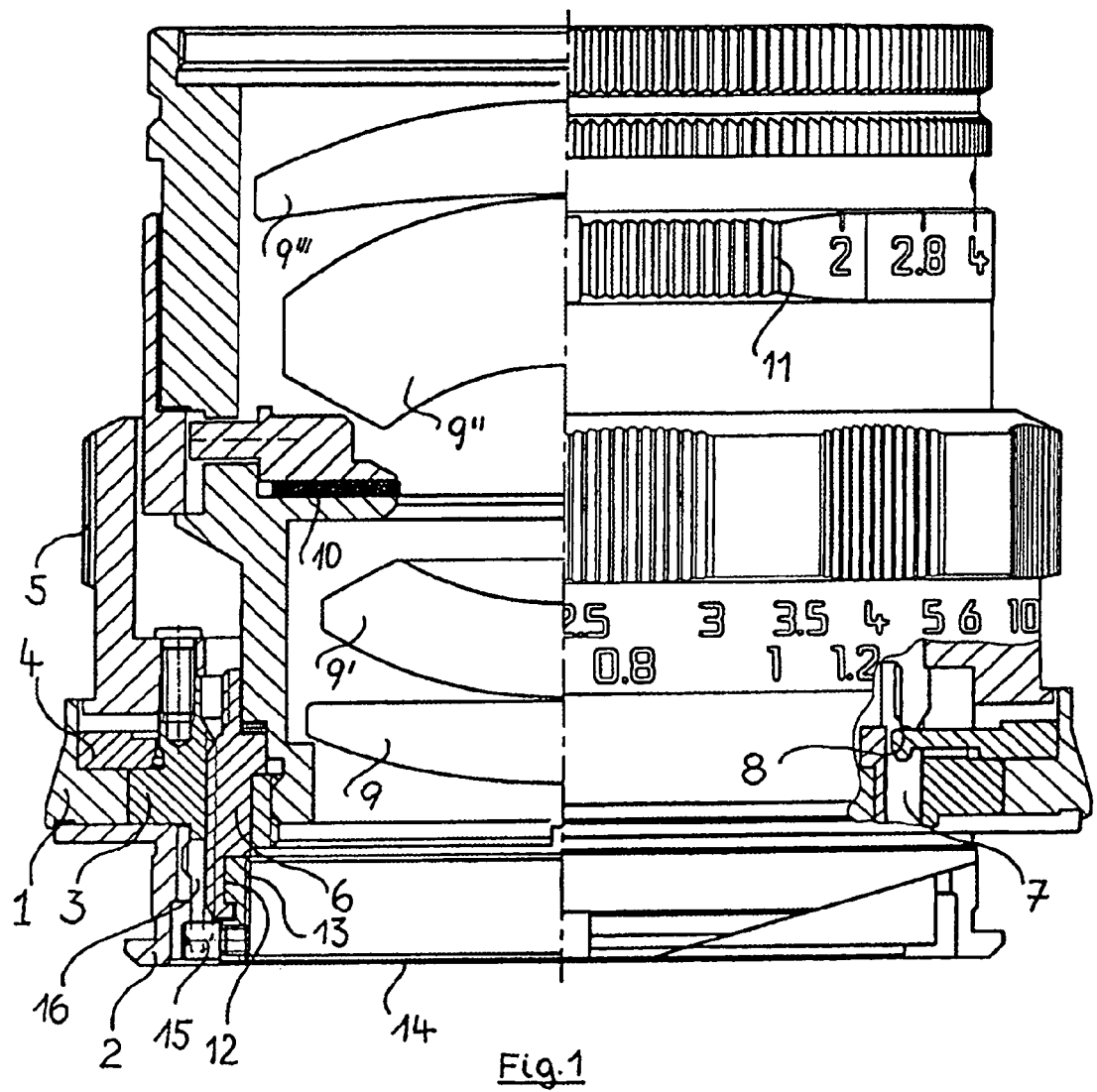
FIG. 1 shows a longitudinal section through the lens mount.

The lens mount illustrated in FIG. 1 comprises a basic body 1 which is connected to a bayonet ring 2. The bayonet ring 2 serves to lock the lens mount with a camera housing (not illustrated). An outer worm 3 is rotatably supported in the basic body 1. The outer worm 3 is held for this purpose on the underside of the bayonet ring 2 and on the upper side by an annular disc 4, likewise connected to the basic body 1.

The outer worm 3 is connected to a distance setting ring 5 such that the rotation thereof is transferred directly to the outer worm 3. The rotation of the distance setting ring 5 is limited by stops (not illustrated here) on the annular disc 4 for the permitted close-up focusing and for infinity focusing.

Inserted into the outer worm 3 is an inner worm 6 that is driven by the outer worm 3. The inner worm 6 has an axial groove 7 in which a nose 8 fitted on the annular disc 4 engages. The axial groove 7 and the nose 8 form a rectilinear guide for the inner worm 6. An identical rectilinear guide 7', 8' is preferably provided in a fashion situated opposite the lens mount illustrated in the cutout in the lens mount.

Further mount parts for holding the imaging lenses 9, 9', 9'', 9''', a diaphragm 10 and a diaphragm setting ring 11 are inserted in a fixed fashion into the inner worm 6. This design is known and will not be further described.

On the camera side, the inner worm 6 has an annular groove 12 in which a cam ring 13 is locked. The locking is described in more detail further below with the aid of FIG. 2. The end face 14 of the cam ring 13 can be designed as an axial cam. It is illustrated as a flat surface without gradient in the exemplary embodiment.

Screwed in at the end of the cam ring 13 on the camera side is a pin 15 that points radially outward and embraces the camera-side end face of the inner worm 6. The head of the pin 15 is guided in an axial groove 16 in the outer worm 3. An identical pin 15' and an identical axial groove 16' are provided (but not illustrated visibly) in the opposite part (illustrated as being closed of the lens mount.

Figure 2:
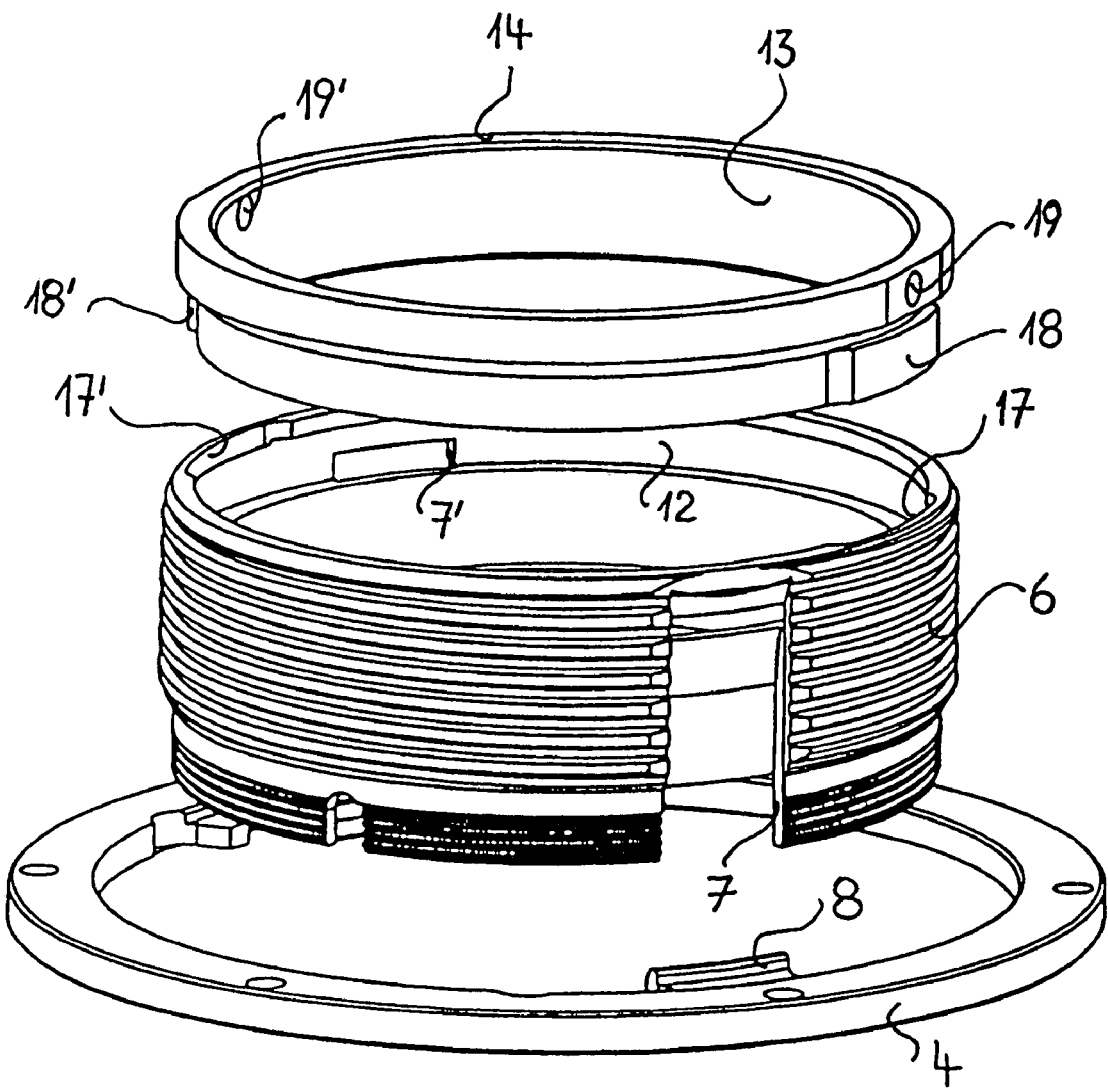
FIG. 2 shows a view of the cam ring and of the inner worm in an exploded illustration.

The illustration in FIG. 2 shows the annular disc 4 and the nose 8, fitted on it, for rectilinearly guiding the inner worm 6, which is provided for the purpose with an axial groove 7. The annular groove 12 is milled at the upper end of the inner worm 6. The annular groove 12 is exposed toward the upper edge at two mutually opposite regions by means of cutouts 17, 17'.

The cam ring 13 has on its outer circumference two sliding noses 18, 18' fitting the cutouts 17, 17' and the cross section of the annular groove 12. After insertion of the sliding noses 18, 18' of the cam ring 13 into the cutouts 17, 17' of the annular groove 12, the cam ring is rotated until the screw holes 19, 19' for screwing in the pins 15, 15' are situated opposite the axial grooves 16 in the outer worm 3. The cam ring 13 is fixed in its rotary position after the pins 15, 15' have been screwed in. Owing to the fact that the rotation of the distance setting ring 5 is limited by stops, in this rotary position the sliding noses 18, 18' cannot pass completely into the region of the cutouts 17, 17'. More than two sliding noses and associated cutouts can also be provided depending on the possible angle of rotation of the distance setting ring. Several sliding noses distributed symmetrically over the circumference of the cam ring visibly improve the stability for mounting the cam ring in the annular groove.

After being screwed to the basic body 1, the bayonet ring 2 covers the heads of the pins 15, 15' such that said basic body is safeguarded against being screwed out without authorization. On the other hand, the bayonet ring 2 can be screwed off in order to fit an individual axial cam on the end face 14 of the cam ring and the cam ring 13 can be unlocked for processing after the pins 15, 15' have been screwed out. No further components are affected by such a measure.

REFERENCE NUMERALS

1 Basic body
2 Bayonet ring
3 Outer worm
4 Annular disc
5 Distance setting ring
6 Inner worm
7 Axial groove in inner worm
8 Nose on annular disc
9 Imaging lens
10 Diaphragm
11 Diaphragm ring
12 Annular groove
13 Cam ring
14 End face cam ring
15 Pin
16 Axial groove in outer worm
17 Cutout
18 Sliding nose
19 Screw hole

The invention claimed is:

1. Lens mount for viewfinder cameras, including a distance setting ring (5) and, coupled thereto, an apparatus for transmitting a set distance to a setting lever of a measuring viewfinder arranged on a camera side, the apparatus including an outer worm (3) connected to the distance setting ring (5), an inner worm (6), inserted in said outer worm and guided rectilinearly (7, 8; 7', 8') in the lens mount, and a cam ring (13) rotatably supported in the inner worm (6) and with an axial cam pointing to the camera side on an end face (14) of the lens mount, wherein the cam ring (13) is locked into an annular groove (12) in an inner wall of the inner worm (6) and is provided with at least two pins (15, 15') which point radially outward over an edge of the inner worm (6) at an end on the camera side, and which engage in each case in an axial groove (16, 16') in the outer worm (3).

2. Lens mount according to claim 1, wherein the inner worm (6) is provided at the end on the camera side with at least two cutouts (17, 17') situated diametrically opposite one another and exposing the annular groove (12), and wherein the cam ring (13) has on its outer circumference at least two sliding noses (18, 18') adapted to the cutouts (17, 17') and to a cross section of the annular groove (12).

3. Lens mount according to claim 2, wherein a radial position of the pins (15, 15') in the cam ring (13) and the axial grooves (16, 16') in the outer worm (3) are such that over an entire rotary path of the distance setting ring (5) the sliding noses (18, 18') are guided inside a closed region of the annular groove (12) in the inner worm (6).

4. Lens mount according to claim 1, wherein the pins (15, 15') are adapted to be screwed through the axial groove (16, 16') in the outer worm (3) into an outer wall of the cam ring (13).

5. Lens mount according to claim 1, further comprising a lens.

6. Lens mount according to claim 1, further comprising a lens (9) and a diaphragm setting ring (11) inserted in a fixed fashion into the inner worm (6).

7. Lens mount according to claim 1, further comprising a lens (9), a diaphragm (10) and a diaphragm setting ring (11) inserted in a fixed fashion into the inner worm (6).

8. Lens mount according to claim 1, further comprising a lens (9), wherein the setting ring (5) is adapted to adjust the focus of light traveling through the lens (9) from a close-up focus to an infinity focus.

9. Lens mount according to claim 1, further comprising a bayonet ring (2), wherein the bayonet ring (2) is adapted to lock the lens mount to a camera housing.

10. A camera, comprising:
a camera housing; and
a lens mount according to claim 9, wherein the lens mount is connected to the camera housing by the bayonet ring (2).

11. A camera according to claim 10, further comprising a setting lever.

* * * * *